(12) United States Patent
Bonacini

(10) Patent No.: US 7,708,045 B2
(45) Date of Patent: May 4, 2010

(54) SPINDLE FOR FITTING VEHICLE WHEEL RIMS ON WORKSHOP MACHINES, PARTICULARLY TIRE-CHANGING MACHINES OR THE LIKE

(75) Inventor: Fabrizio Bonacini, Correggio (IT)

(73) Assignee: Giuliano S.p.A., Correggio (RE) (IT)

( * ) Notice: Subject to any disclaimer, the term of this patent is extended or adjusted under 35 U.S.C. 154(b) by 0 days.

(21) Appl. No.: 11/739,992

(22) Filed: Apr. 25, 2007

(65) Prior Publication Data

US 2007/0257412 A1   Nov. 8, 2007

(30) Foreign Application Priority Data

May 5, 2006   (IT)   .......................... MO2006A0141

(51) Int. Cl.
*B60C 25/00* (2006.01)
(52) U.S. Cl. .......................................... 157/21; 157/16
(58) Field of Classification Search ............. 157/14–21, 157/1.24; 269/107, 109, 203, 111–120, 153, 269/155
See application file for complete search history.

(56) References Cited

U.S. PATENT DOCUMENTS 3,493,030 A   2/1970  Strang et al.
4,750,538 A   6/1988  Quesne
7,201,204 B2 *  4/2007  Corghi et al. ................. 157/16

FOREIGN PATENT DOCUMENTS

DE   2730815   1/1978
EP   0644071   3/1995

* cited by examiner

*Primary Examiner*—D. S Meislin
(74) *Attorney, Agent, or Firm*—Dykema Gossett PLLC

(57) ABSTRACT

The spindle for fitting vehicle wheel rims on workshop machines, particularly tyre-changing machines or the like, comprises a frame associable in rotation around a work axis with a workshop machine, at least three gripping adapters of the rim of a wheel associable with the frame and moving along respective approach and away movement directions with respect to the work axis, at least a fluid-operated actuator cylinder associated with one of the gripping adapters and suitable for moving the adapter along the corresponding approach and away movement direction, at least three racks, each of which is associated with one gripping adapter and extends substantially parallel with the corresponding approach and away movement directions, and a pinion meshed with the racks.

18 Claims, 6 Drawing Sheets

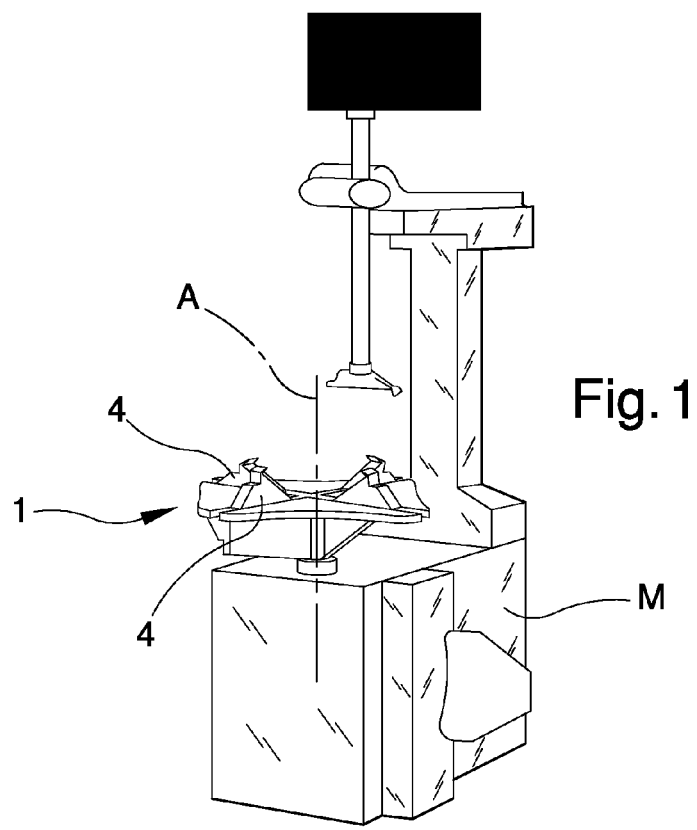
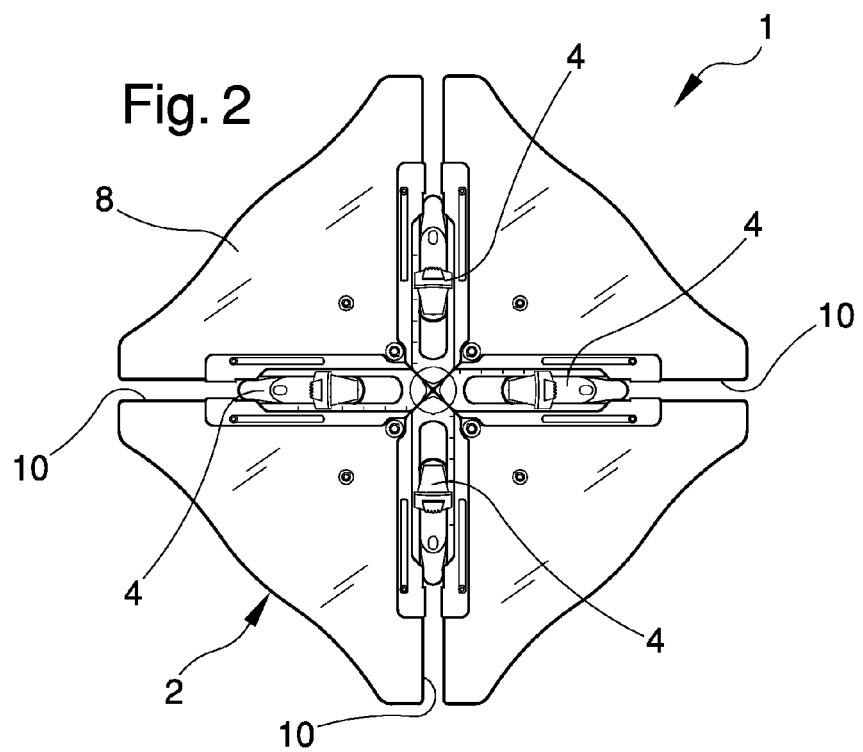

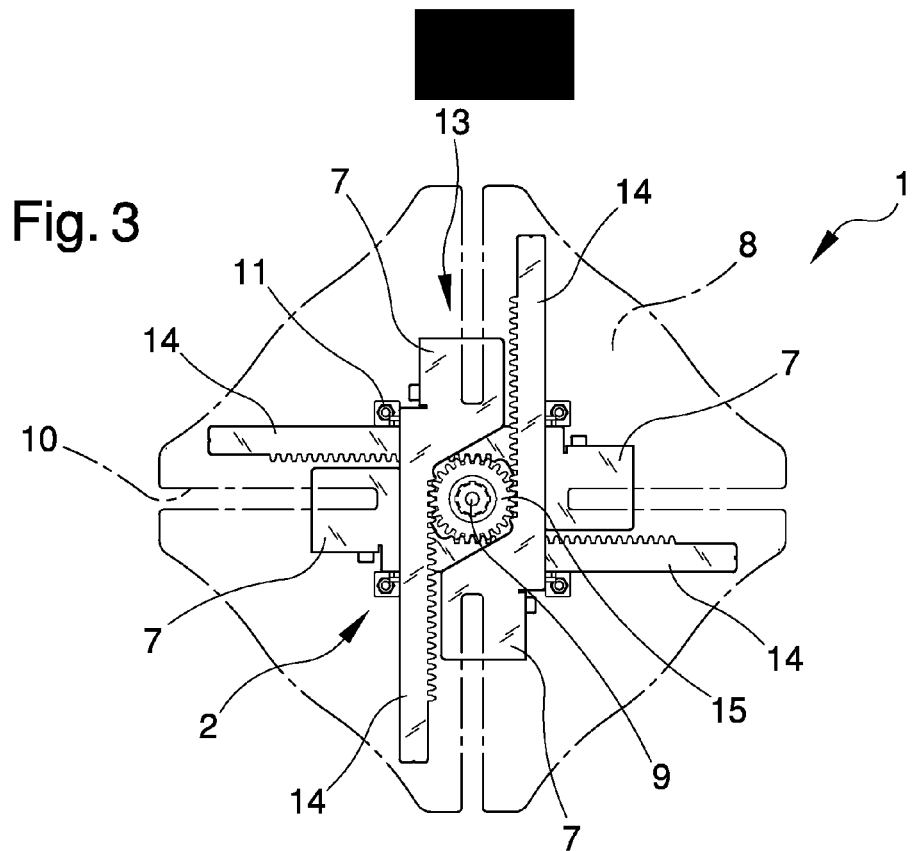
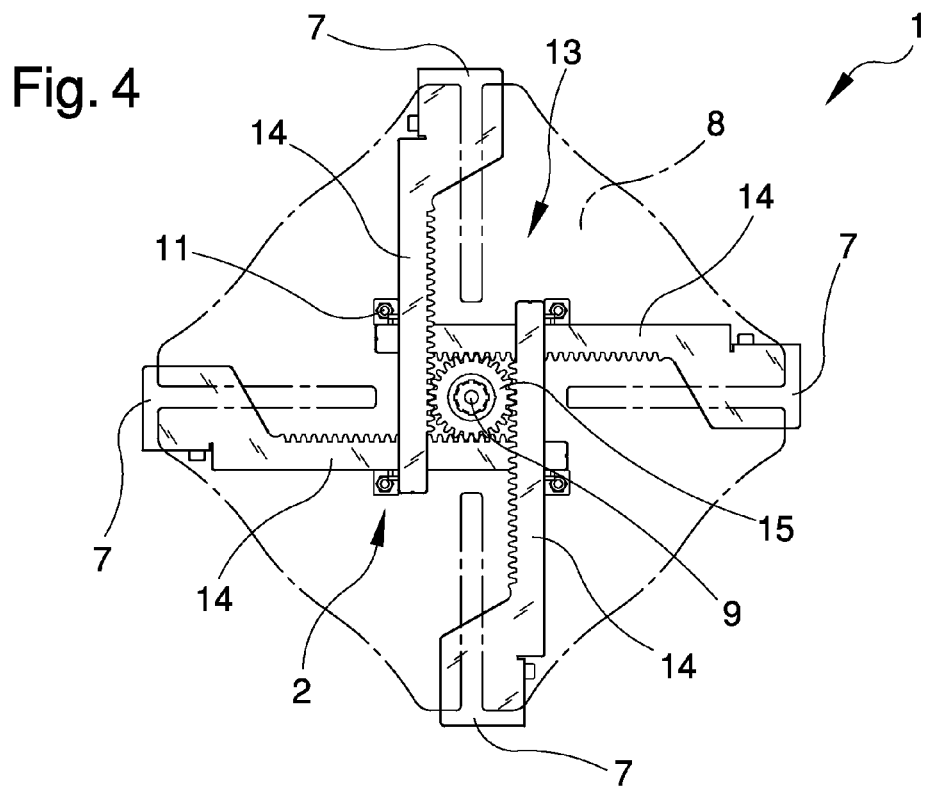

SPINDLE FOR FITTING VEHICLE WHEEL RIMS ON WORKSHOP MACHINES, PARTICULARLY TIRE-CHANGING MACHINES OR THE LIKE

BACKGROUND OF THE INVENTION

1. Field of the Invention

This invention relates to a spindle for fitting vehicle wheel rims on workshop machines, particularly for tire-changing machines or the like.

2. The Prior Art

The use is known of so-called tire-changing machines that permit fitting or removing the tire onto and from the relevant rim of a wheel for vehicles, e.g., for carrying out maintenance jobs or replacing the rim and/or the tire itself. Such tire-changing machines generally consist of a base structure that supports a spindle for gripping and rotating a wheel rim, and of at least one tool arm having one or more tools suitable for removing and/or fitting the tire from and onto the rim.

Various types of spindle of known type exist.

A first type consists of a rim coupling plate, which is mounted on the base structure of the tire-changing machine so that it turns around a central work axis and which is provided with four rim gripping adapters.

The adapters are moving from the centre towards the outside of the plate, and vice versa, between a closing configuration, corresponding to the positioning of the adapters at the centre of the plate, and an opening configuration, corresponding to the positioning of the adapters at the periphery of the plate.

The adapter movement is by means of a rotating pinion arranged at the centre of the plate and which engages with four racks sliding longitudinally.

The outer ends of the racks are associated with the gripping adapters and push these to move when the rotor is driven in rotation by means of an independent gearmotor.

Once the rim has been secured on the coupling plate, this is caused to rotate around the central work axis.

These spindles of known type have a number of drawbacks including the fact that, in case of gearmotor malfunction or breakage of the racks or the pinion, the locking force of the gripping adapters can suddenly and abruptly go missing, with the risk of the wheel, rotating at high speed, coming off the coupling plate and jeopardizing the integrity of the equipment and the safety of the persons near the machine.

In a second type of spindle for tire-changing machines, the gripping adapters are caused to open and close by means of a pair of pneumatic cylinders. The cylinder rods, or the liners, are associated with the coupling plate while the corresponding liners, or the corresponding rods, are connected to two distinct gripping adapters; different spindles are however known in which the pneumatic cylinders are not connected to the coupling plate, but are interposed between two gripping adapters positioned opposite one another.

The pneumatic cylinders are arranged parallel to the direction of opening and closing of the two gripping adapters to which they are connected and directly control the opening and closing of the latter.

The remaining gripping adapters, on the other hand, are pushed moving by means of a particular kinematic lever system which is connected to the liners or to the rods, of the pneumatic cylinders and which transforms the movement of the cylinders themselves into the opening and closing movement of the adapters.

These spindles of known type also have a number of drawbacks.

In this respect the fact is underlined that the above lever kinematic system is usually rather complicated in terms of structure and the thrust force it can transmit to the gripping adapters to which it is connected is not constant during spindle opening and closing but, in fact, varies according to the position of the adapters.

Unfortunately therefore, the tightening of a wheel on the coupling plate can prove more or less successful depending on the size of the rim. It should also be taken into consideration that for this type of spindle as well, the previously made considerations are valid as regards the risks and the hazards which the personnel charged with operating the machine could encounter in case of breakdown; the malfunction of just one of the pneumatic cylinders in fact is enough to prevent the operativeness and correct operation of the machine. The main aim of the present invention is to provide a spindle for fitting vehicle wheel rims on workshop machines, particularly tire-changing machines or the like, that is practical, functional, and able to operate in conditions of utmost safety for the integrity of the equipment and the safety of the persons who find themselves near the machine.

A further object of the present invention is to be of simple construction, structurally sturdy and with a relatively low cost.

SUMMARY OF THE INVENTION

The above objects are all achieved by this spindle for fitting vehicle wheel rims on workshop machines, particularly tire-changing machines or the like, comprising at least one frame associable in rotation around a work axis with a workshop machine, and at least three gripping adapters of the rim of a wheel associable with said frame and moving along respective approach and away movement directions with respect to said work axis, wherein in the spindle comprises at least one fluid-operated piston-cylinder assembly associated with at least one of said gripping adapters and suitable for moving the adapter along the corresponding approach and away movement direction, at least three racks, each of which is associated with each of said gripping adapters and extends substantially parallel with each of said approach and away movement directions, and at least one pinion meshed with said racks.

Further characteristics and advantages of this invention will appear even more evident from the detailed description of a preferred, but not exclusive, embodiment of a spindle for fitting vehicle wheel rims on workshop machines, particularly tire-changing machines or the like, illustrated indicatively by way of non limiting example, in the attached drawings.

BRIEF DESCRIPTION OF THE DRAWINGS

FIG. 1 is a perspective view of a tire-changing machine on which is fitted the spindle according to the invention;

FIG. 2 is an overhead view of the spindle according to the invention;

FIG. 3 is a plan view of a portion of the spindle according to the invention which illustrates in detail the synchronisation arrangement in the gripping adapter closing configuration;

FIG. 4 is a plan view of the portion of FIG. 3 which illustrates in detail the synchronisation arrangement of the spindle according to the invention in the gripping adapter opening configuration;

DETAILED DESCRIPTION OF THE PREFERRED EMBODIMENTS

Figure 5:
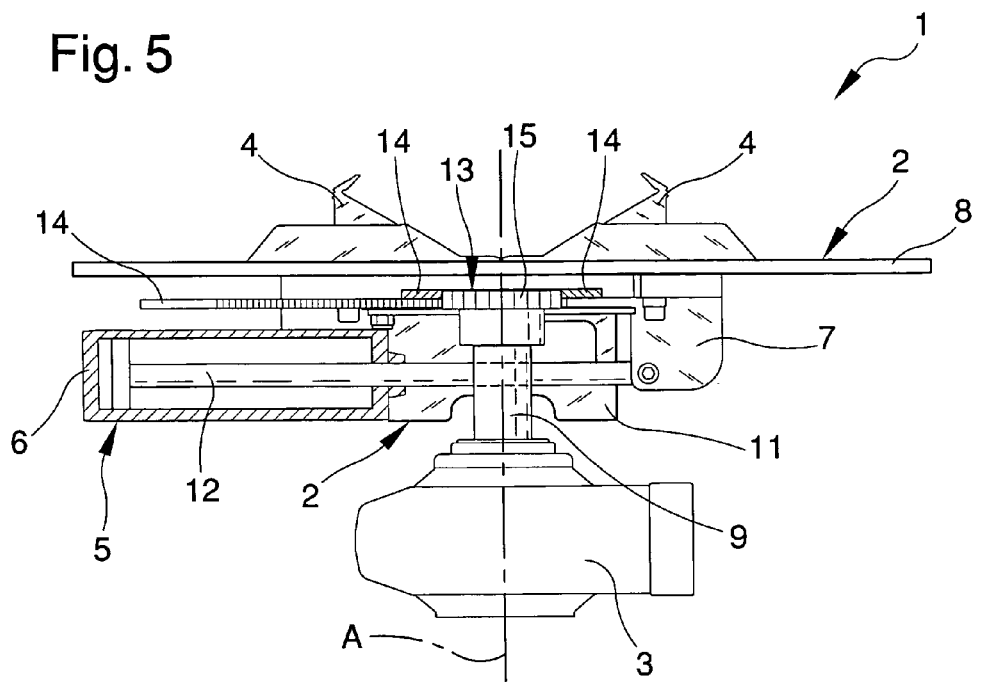
FIG. 5 is a plan raised side view of the spindle according to the invention in the gripping adapter closing configuration.
Figure 6:
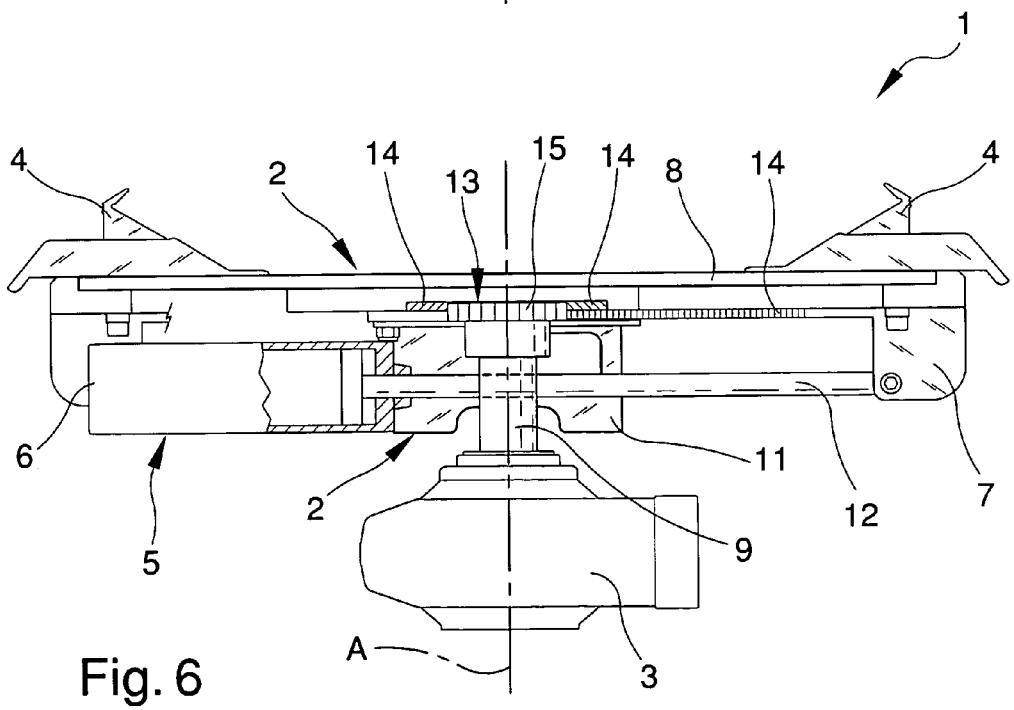
FIG. 6 is a raised side view of the spindle according to the invention in the gripping adapter opening configuration.
Figure 7:
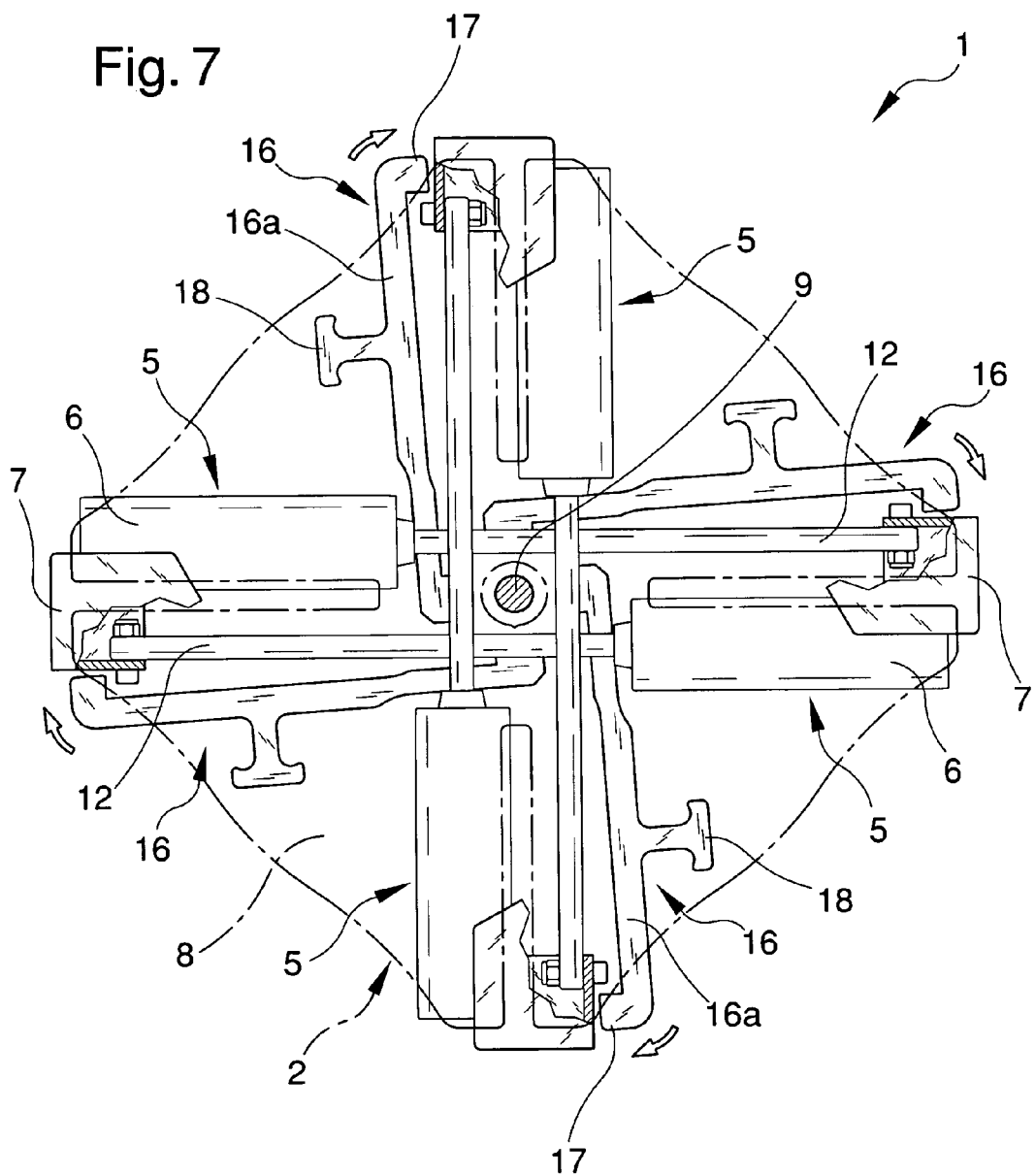
FIG. 7 illustrates the piston-cylinder assemblies and relative adjustment arrangement in an idle position in which the stop elements of the adjustment arrangement are arranged away from the trajectories of movement of the brackets 7.
Figure 8:
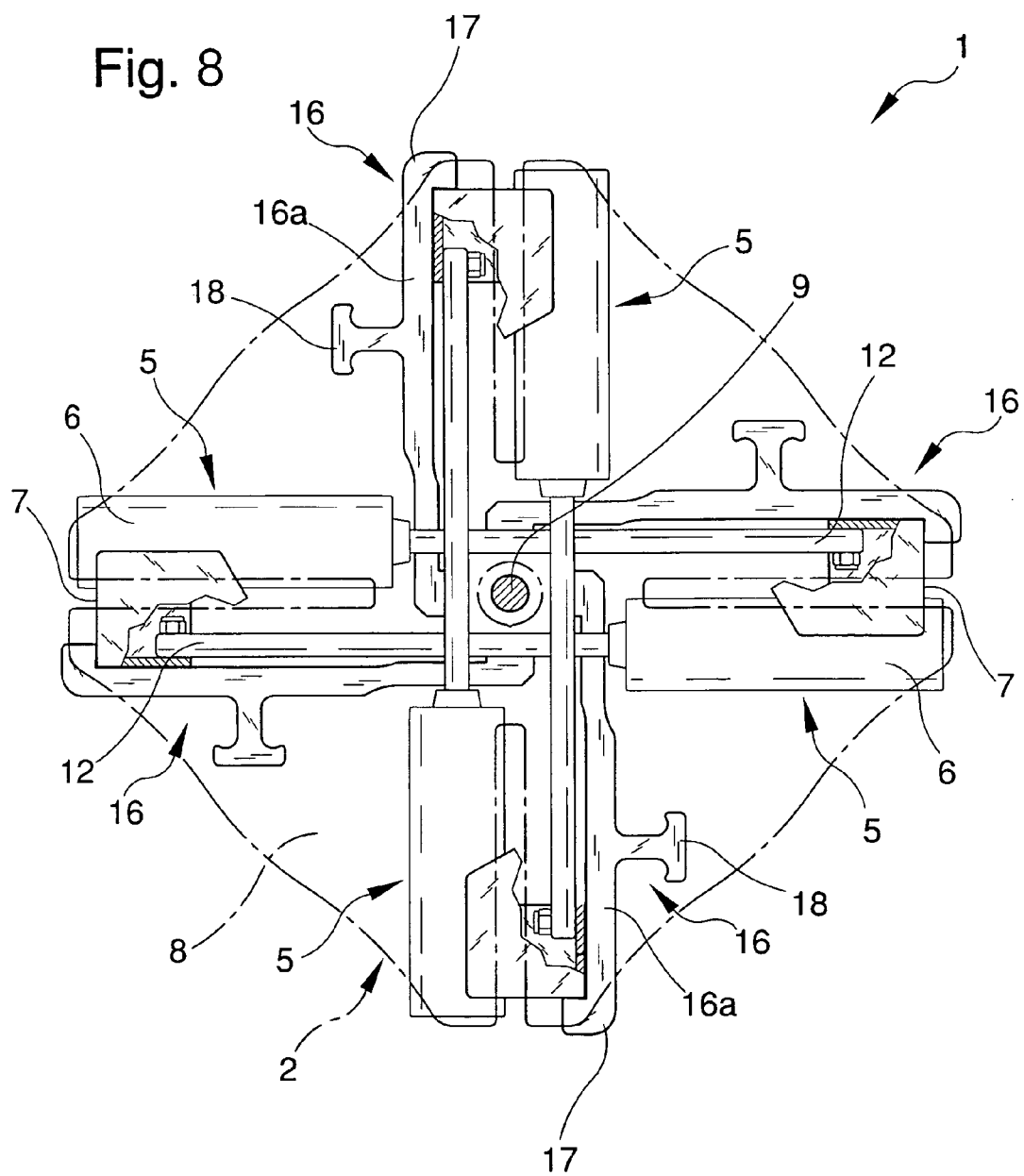
FIG. 8 is a plan view of the portion of the FIG. 7 which illustrates in detail the piston-cylinder assemblies and the relative adjustment arrangement in a operating position, in which the stop elements 17 of the adjustment arrangement are arranged in the trajectories of movement of the brackets 7.
Figure 9:
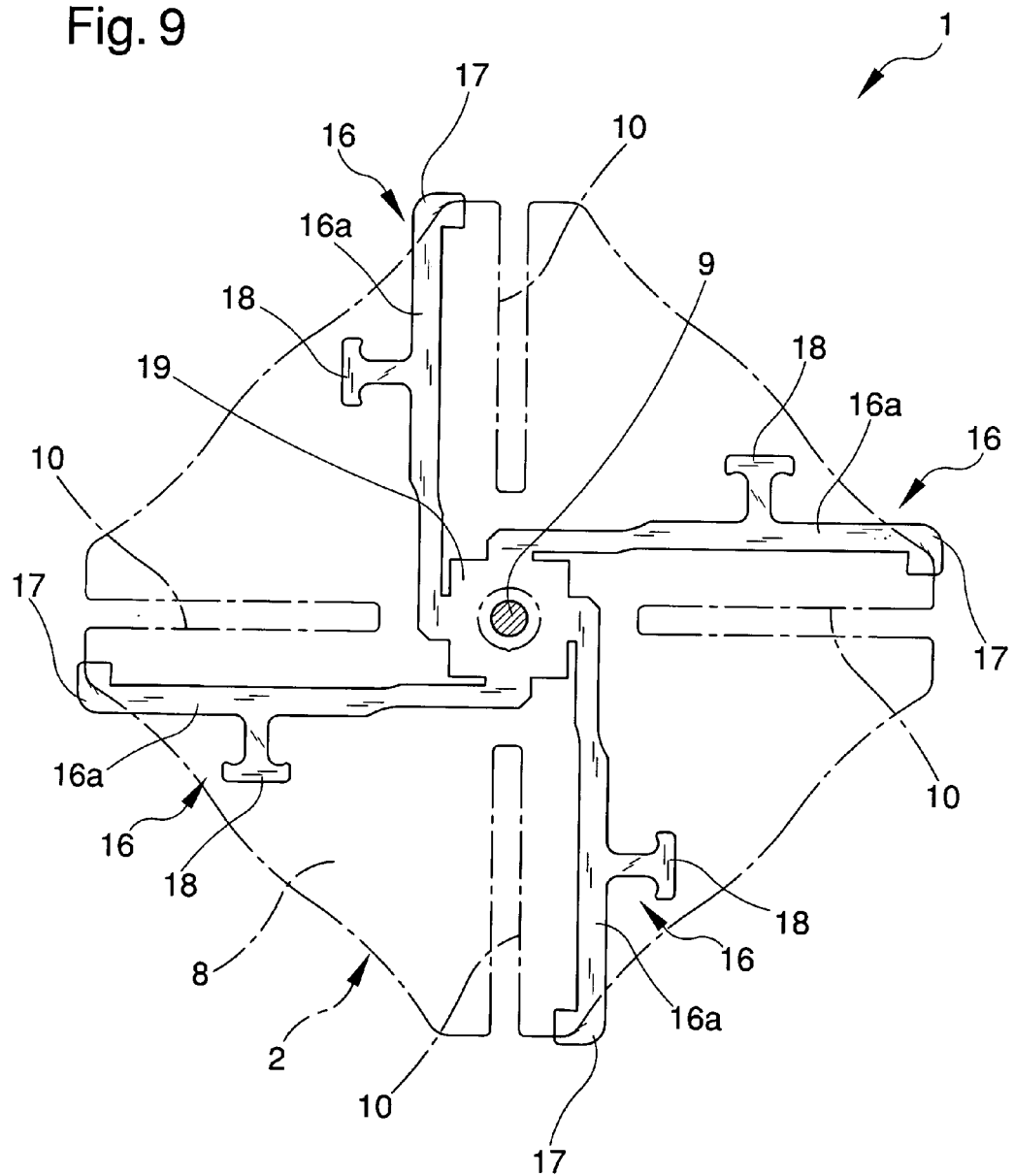
FIG. 9 is a plan view of a portion of the spindle according to the invention which illustrates in detail the adjustment arrangement and, in particular, the connecting element 19 that connect the bars 16 of the adjustment arrangement 16-18 to the frame.

The spindle, generally indicated by reference numeral 1, fits vehicle wheel rims on workshop machines, particularly tire-changing machines or the like.

In the particular application of the present invention shown in FIG. 1, the workshop machine is made up of a tire-changing machine M used to fit and remove tires to and from vehicle wheel rims, but it is intuitive to appreciate how the spindle 1 can be fitted on any workshop machine which, similarly, requires the gripping of rims for carrying out particular jobs on wheels.

The spindle 1 comprises a frame 2 that can be associated with the tire-changing machine M to be rotated around a work axis A by means of a gearmotor 3.

In the particular embodiment of the invention shown in FIG. 1, the work axis A is vertical but alternative applications cannot be ruled out in which the spindle 1 is mounted turnable around a horizontal axis or otherwise tilted.

On the frame 2 four gripping adapters 4 are fitted for gripping the rim of a wheel that move along respective radial approach and away movement directions with respect to the work axis A, two by two orthogonal to each other. Each of the gripping adapters 4 is associated with a corresponding piston-cylinder assembly 5 which is fluid-operated (pneumatic, hydraulic, etc.), having a fixed cylinder 6 associated with the frame 2 and a thrust moving end 7 associated with the corresponding gripping adapter 4.

The frame 2 is made up of a plate 8 orthogonal to the work axis A, and which is associated integral with the output shaft 9 of the gearmotor 3 and has an upper surface from which the gripping adapters 4 protrude.

In detail, on the plate 8, four through longitudinal slots 10 are obtained for sliding the gripping adapters 4 which define the approach and away movement directions with respect to the work axis A.

The plate 8 also has a lower surface, the central portion of which is associated with a supporting mount 11 for supporting the piston-cylinder assemblies 5.

The piston-cylinder assemblies 5 are arranged along axes parallel with the approach and away movement directions of the gripping adapters 4 and are skew with respect to the work axis A.

The fixed cylinders 6 of the piston-cylinder assemblies 5 are made up of a base portion which couples onto the mount 11.

The moving ends 7, on the other hand, consist of a connecting bracket for connecting the rod 12 of the piston-cylinder assemblies 5 to the gripping adapters 4; such brackets are arranged through the longitudinal slots 10.

The spindle 1 has synchronisation arrangement 13 for synchronising the movement of the gripping adapters 4.

Such synchronisation arrangement consist of four racks 14, each of which is associated with a bracket 7 and extends substantially parallel with one of the approach and away movement directions with respect to the work axis A.

To the racks 14 a pinion 15 is meshed turnable idle around an axis coaxial to the work axis A; the pinion 15, in particular, is made up of an external-toothing annular element which is fitted freely sliding around the output shaft 9 of the gearmotor 3 underneath the plate 8.

The racks 14 are arranged two by two parallel to each other and diametrically opposed with respect to the pinion 15.

In particular, two racks 14 mesh with the upper part of the pinion 15 and are arranged above the other two racks 14, which on the other hand mesh with the lower part of the pinion 15.

The spindle 1 has an adjustment arrangement 16 for adjusting the stroke of the rods 12 of the piston-cylinder assemblies 5 which, for easier representation, are shown in detail only in FIG. 5.

The adjustment arrangement 16 consist of a plurality of bars 16a, one for each gripping adapter 4, which have at least one stop element 17 for stopping the sliding of the adapters themselves.

The bars 16a, in particular, are associated to one another at the mount 11 at the centre of the frame 2 and are turnable in an integral way with each other between one operating position, in which the stop elements 17 are arranged on the trajectories of movement of the brackets 7, and an idle position, in which the stop elements 17 are arranged substantially away from such trajectories. In the particular embodiment of the invention shown in FIG. 5, the adjustment arrangement 16 is arranged in the idle position and do not intervene to change the stroke of the piston-cylinder assemblies 5; the path of the gripping adapters 4 therefore corresponds to the length of the cylinders themselves.

Such adjustment arrangement also comprise just one stop element 17 which is arranged at the free end of each bar 16a.

Once placed in the operating position, the stop elements 17 act as a stop for the brackets 7 in the opening configuration of the gripping adapters 4; the active stroke of the actuator cylinders 5 assessed starting from the closing configuration is therefore determined by the length of the bars 16a and by the distance of the stop elements 17 from the mount 11.

Furthermore, alternative embodiments of the invention are possible in which the bars 16a have with a plurality of stop elements 17 arranged at different distances from the centre of the plate 8 and suitable for permitting the positioning of the gripping adapters 4 in different opening configurations. At the median portions, the bars 16a have a gripping grip 18 for moving these manually between the operating configuration and the idle configuration.

It has in fact been seen how the described invention achieves the set objects.

In this respect, the fact is underlined that the present invention is able to operate in conditions of utmost safety and functionality even in the event of the malfunction of one or two actuator cylinders.

In this case, in fact, the operation of the remaining actuator cylinders permits controlling the opening and closing of all the gripping adapters, transmitting the movement from one adapter to another by means of the pinion-rack coupling. The invention thus conceived is susceptible of numerous modifications and variations, all of which falling within the scope of the inventive concept. Furthermore all the details may be replaced by other elements which are technically equivalent.

In practice, the materials used, as well as the contingent shapes and dimensions, may be any according to requirements without because of this moving outside the protection scope of the following claims.

The invention claimed is:

1. A spindle for fitting vehicle wheel rims on workshop machines, comprising
   at least one frame associable in rotation around a work axis with a workshop machine, and at least three gripping adapters for gripping the rim of a wheel associable with said frame and moving along respective approach and away movement directions with respect to said work axis,
   a plurality of fluid-operated piston-cylinder assemblies, each of said plurality of fluid-operated piston-cylinder assemblies being associated with a respective one of said at least three gripping adapters for moving the respective gripping adapter along the corresponding approach and away movement direction,
   at least three racks, each of which is associated with a respective one of said gripping adapters and extends substantially parallel with a respective one of said approach and away movement directions, and
   at least one pinion meshed with said racks to synchronize movement of the racks, said pinion being freely rotatable around an output shaft of a motor.

2. The spindle according to claim 1, wherein each of said piston-cylinder assemblies comprises a fixed cylinder associated with said frame and a rod attached to a thrust moving end associated with a respective gripping adapter.

3. The spindle according to claim 1, wherein said approach and away movement directions are substantially radial with respect to said work axis.

4. The spindle according to claim 1, wherein said frame comprises at least one plate substantially orthogonal to said work axis.

5. The spindle according to claim 4, wherein said plate has a surface from which said gripping adapters protrude and an opposite surface with which said piston-cylinder assemblies are associated.

6. The spindle according to claim 4, wherein said plate comprises a plurality of longitudinal slots for sliding said gripping adapters.

7. The spindle according to claim 4, wherein said frame comprises a supporting mount for supporting said piston-cylinder assemblies associated with said plate.

8. The spindle according to claim 1, wherein said piston-cylinder assemblies are arranged along axes substantially parallel with said approach and away movement directions.

9. The spindle according to claim 1, wherein said piston-cylinder assemblies are arranged along axes which are substantially skewed with respect to said work axis.

10. The spindle according to claim 2, wherein a cylinder of each piston-cylinder assembly is fixed relative to said frame.

11. The spindle according to claim 2, wherein each said moving end comprise a connecting bracket for connecting the rods of a piston-cylinder assembly to a respective gripping adapters.

12. The spindle according to claim 11, wherein said frame comprises at least one plate substantially orthogonal to said work axis, said plate comprises a plurality of longitudinal slots for sliding said gripping adapters and said connecting brackets are arranged through said longitudinal slots.

13. The spindle according to claim 1, wherein said pinion is turnable around an axis substantially parallel with said work axis.

14. The spindle according to claim 1, wherein said pinion is substantially coaxial to said work axis.

15. The spindle according to claim 1, wherein at least two of said racks are arranged parallel and diametrically opposed with respect to said pinion.

16. The spindle according to claim 1, wherein at least two of said racks are arranged one above the other.

17. The spindle according to claim 1, including four gripping adapters, two by two moving along approach and away movement directions orthogonal to each other.

18. The spindle according to claim 1, including four of said racks, two by two arranged along directions orthogonal to each other.

* * * * *